(12) United States Patent
Izumi

(10) Patent No.: US 8,992,128 B2
(45) Date of Patent: Mar. 31, 2015

(54) PNEUMATIC FENDER AND METHOD FOR TRANSPORTING SAME

(75) Inventor: Minami Izumi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 13/989,607

(22) PCT Filed: Oct. 26, 2011

(86) PCT No.: PCT/JP2011/074716
§ 371 (c)(1),
(2), (4) Date: May 24, 2013

(87) PCT Pub. No.: WO2012/070351
PCT Pub. Date: May 31, 2012

(65) Prior Publication Data
US 2013/0251459 A1  Sep. 26, 2013

(30) Foreign Application Priority Data

Nov. 26, 2010  (JP) ................................. 2010-263482

(51) Int. Cl.
*E02B 3/26*   (2006.01)
*B65G 67/00*  (2006.01)
*B63B 59/02*  (2006.01)

(52) U.S. Cl.
CPC . *E02B 3/26* (2013.01); *B65G 67/00* (2013.01); *B63B 2059/025* (2013.01); *B63B 59/02* (2013.01)
USPC .......................................... 405/211; 114/219

(58) Field of Classification Search
USPC ........... 405/211–216; 114/219–220; 441/135; 383/3, 120, 105
See application file for complete search history.

(56) References Cited

U.S. PATENT DOCUMENTS 3,201,111 A * 8/1965 Afton .............................. 267/153
3,727,825 A * 4/1973 Troth ............................. 229/153

(Continued)

FOREIGN PATENT DOCUMENTS

CN   201376658 Y   1/2010
JP   60-051211 A   3/1985

(Continued)

OTHER PUBLICATIONS

International Search Report of corresponding International Application No. PCT/JP2011/074716, dated on Jan. 31, 2012.

(Continued)

*Primary Examiner* — David Bagnell
*Assistant Examiner* — Kyle Armstrong
(74) *Attorney, Agent, or Firm* — Global IP Counselors, LLP

(57) ABSTRACT

A pneumatic fender is configured to improve workability during folding up, be conveniently secured during transport, and suppress damage during folding up and during transport, thus increasing durability. A method for transporting the pneumatic fender also has these characteristics. In the, pneumatic fender, at least one crease is formed extending in the lengthwise direction at the outer surface of a torso body section in the pneumatic fender. After the air has been discharged from the pneumatic fender, a bag is pushed flat with mirror body sections as the upper surface of the torso body section and then with the crease as a boundary, the bag is folded towards the upper surface. In this folded state, the pneumatic fenders are loaded into a container and transported.

8 Claims, 5 Drawing Sheets

(56) References Cited

U.S. PATENT DOCUMENTS

| | | | |
|---|---|---|---|
| 3,863,589 A * | 2/1975 | Guienne et al. | 114/219 |
| 4,557,956 A * | 12/1985 | Volpert et al. | 428/34.1 |
| 4,733,992 A * | 3/1988 | Dehlen | 405/215 |
| 4,924,796 A * | 5/1990 | Duffy | 114/219 |
| 5,685,752 A * | 11/1997 | Fulton, Jr. | 441/90 |
| 6,357,377 B1 * | 3/2002 | Santelli, Jr. | 114/219 |
| 8,087,371 B1 * | 1/2012 | Sadegh et al. | 114/220 |
| 2003/0200910 A1 * | 10/2003 | Corlett | 114/219 |

FOREIGN PATENT DOCUMENTS

| | | |
|---|---|---|
| JP | 60-203715 A | 10/1985 |
| JP | 05-278150 A | 10/1993 |
| JP | 2006-291628 A | 10/2006 |
| WO | 2005/105564 A1 | 11/2005 |

OTHER PUBLICATIONS

Office Action issued in corresponding Korean Patent Application No. 10-2013-7015208, dated Oct. 15, 2013.

* cited by examiner

PNEUMATIC FENDER AND METHOD FOR TRANSPORTING SAME

CROSS-REFERENCE TO RELATED APPLICATIONS

This U.S. National stage application claims priority under 35 U.S.C. §119(a) to Japanese Patent Application No. 2010-263482, filed in Japan on Nov. 26, 2010, the entire contents of Japanese Patent Application No. 2010-263482 are hereby incorporated herein by reference.

BACKGROUND

1. Field of the Invention

The present invention relates to a pneumatic fender and a method for transporting the same, in particular, a pneumatic fender and a method for transporting the same in which convenience in the transportation is maintained and the reduction in durability is suppressed.

2. Background Information

In general, a pneumatic fender is arranged with a bag including a cylindrical torso body section and dome-shaped minor body sections connected to both ends thereof. When the outer diameter of the torso body section of such the pneumatic fender is 2.5 m or more, the transportation of the inflated pneumatic fender will be restricted by the vehicle restriction under the Road Traffic Law (width: 2.5 m, length: 12 m, height: 3.8 m in Japan, for example). Thus, there is a problem that the inflated pneumatic fender cannot be transported by a vehicle.

For countermeasure to the problem, conventionally, the pneumatic fender has been transported by discharging the air from the pneumatic fender to collapse it flat and folding it so that it corresponds to the width of a container of the vehicle, and then loading the folded pneumatic fender into the container.

However, since the bag of this type of pneumatic fender is made up of a rubber layer reinforced with steel cables, organic fiber cables, and the like, the bag itself is rigid and thus is difficult to be folded into a desired shape. Further, since the weight of the largest class pneumatic fender reaches 4.8 tons and therefore a heavy machinery such as a crane is needed for the folding operation, which requires sufficient consideration for safety and takes much time and thus there is a problem of extremely poor operability. Further, since an unnecessary force is locally applied to the bag, the outer surface of the bag is likely to be damaged. Furthermore, there is a problem that the folds caused by the folding result in the decrease in the strength and reduction in the durability.

In order to overcome these problems, it has been proposed to improve the durability by providing some additional member to the outer circumferential surface of the rubber film of the bag to reduce the local bending distortion caused by the folding (for example, refer to JP-A-2006-291628). However, this proposal does not directly result in the improvement of the operability of the folding, and therefore further improvement has been demanded.

SUMMARY

An object of the present invention is to overcome the problems as described above and provide a pneumatic fender and a method for transporting the same in which the operability in the folding to maintain convenience in the transportation and suppress the reduction in durability.

In order to achieve the above object, provided is a pneumatic fender of the present invention having a bag including a cylindrical torso body section and dome-shaped mirror body sections connected to both ends of the torso body section, and characterized in that at least one crease extended in a longitudinal direction is formed in an outer surface of the torso body section.

Further, when the pneumatic fender having a bag including a cylindrical torso body section and dome-shaped mirror body sections connected to both ends of the torso body section, in which a crease extended in a longitudinal direction is formed in an outer surface of the torso body section, is loaded into a container and transported, a method for transporting a pneumatic fender of the present invention is characterized in the processes of collapsing the bag flat with the mirror body sections facing upward after air is discharged from the bag; subsequently, folding the bag along the crease as a border onto an upper surface of the bag; and loading the folded bag into a container to transport it.

According to the present invention, at least one crease extended in the longitudinal direction is formed in the outer surface of the torso body section constituting the pneumatic fender. The folding operation can be performed along the crease as the border, which can improve the operability in the folding while allowing for the folding into a desired shape. In addition, the reduction in durability due to the folding can be suppressed.

Further, the formation of the crease allows the shape of the folded bag to be stabilized, which prevents the external damage from occurring during the transportation such as in the loading into the container and thus can suppress the reduction in durability due to the transportation.

DETAILED DESCRIPTION OF EMBODIMENT

Figure 1A:
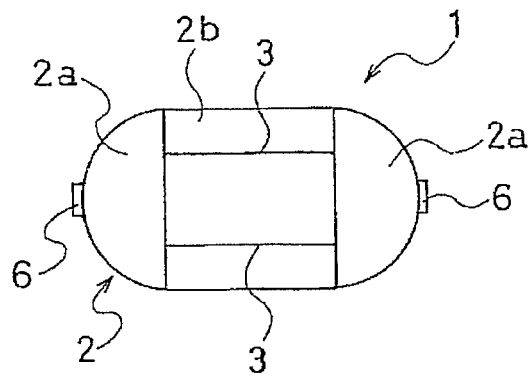
FIG. 1(A) is a front view illustrating an outline of one embodiment of a pneumatic fender according to the present invention.

A pneumatic fender of the present invention will be described below in detail by referring to embodiments illustrated in the drawings.

Figure 1B:
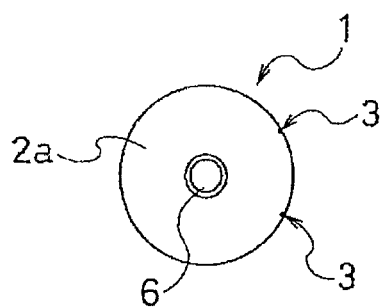
FIG. 1(B) is a side view thereof.

In the embodiment of the present invention illustrated in FIG. 1(A) and FIG. 1(B), a pneumatic fender 1 is arranged with a bag 2 having a cylindrical torso body section 2b and dome-shaped mirror body sections 2a, 2a connected to the both ends thereof. A cap portion 6 is arranged at the center of each of the dome-shaped mirror body sections 2a, 2a. A not-shown air supply-exhaust hole is provided to the cap portion 6 and the air is supplied inside the bag 2 through the air supply-exhaust hole.

It is noted that FIG. 1(A) indicates the borders of the torso body section 2b and the mirror body sections 2a, 2a in the solid lines. The same applies to each of the following figures. In some types of the pneumatic fender 1, the cap portion 6 may be provided to one of the minor body sections 2a.

Figure 2:
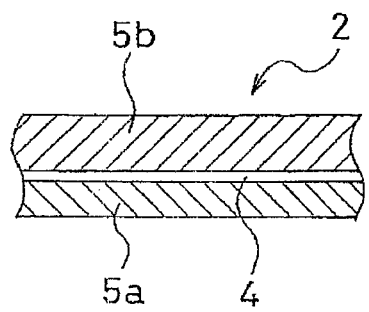
FIG. 2 is a partial cross-sectional view of a bag of the pneumatic fender.

The bag 2 is arranged with a reinforcement layer 4 interposed between an inner layer rubber 5a and an outer layer rubber 5b, as illustrated in FIG. 2. For the rubber composition of the inner layer rubber 5a and the outer layer rubber 5b, a rubber composition including the natural rubber or more than one rubbers selected from the natural rubber, the styrene-butadiene rubber, and the butadiene rubber may be preferably used, but not limited to them. For example, the rubber composition including the diene rubber such as the chloroprene rubber, the nitrile butadiene rubber, and the like, the olefin rubber such as the EPDM and the like, and the blend rubber thereof may be used according to the purpose. For the reinforcement layer 4, the organic fiber cable or the steel cable such as polyester, nylon, and the like may be preferably used.

Then, in the pneumatic fender 1 of the present invention, as illustrated in FIG. 1(A), at least one (two in the figure) creases 3, 3 extended in the longitudinal direction are formed in the outer surfaces of the torso body section 2b of the bag 2. As described later, the bag 2 is folded in the width direction (the vertical direction in the sheet) along these creases 3, 3 as the borders and loaded to the vehicle. Therefore, even if the pneumatic fender is large, the land transportation of the pneumatic fender is made possible without being applied with the restriction under the Road Traffic Law.

As such, in the pneumatic fender 1 of the present invention, the creases 3, 3 extended straight in the longitudinal direction are formed in the outer surface of the torso body section 2b, so that the bag 2 can be folded along the creases 3, 3 as the borders. This allows for the improved operability in the folding while allowing for the folding into the desired shape. In addition, the unnecessary external force at the folding is reduced, which can suppress the reduction in durability of the bag 2 due to the folding.

Figure 3:
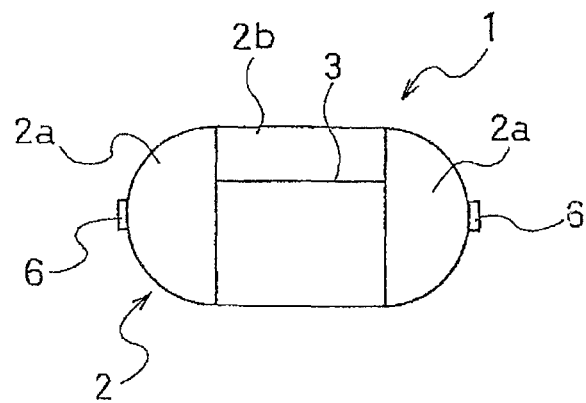
FIG. 3 is a front view (the view corresponding to FIG. 1(A)) illustrating an outline of another embodiment.

It is noted that, in the above embodiment of FIG. 1(A), although the case where two creases 3, 3 extended in the longitudinal direction are formed in the outer surface of the torso body section 2b has been represented, the number of the creases 3 is not limited to it. As illustrated in FIG. 3, one crease 3 only may be formed and, as further described later, three or more creases may be formed.

Figure 4A:
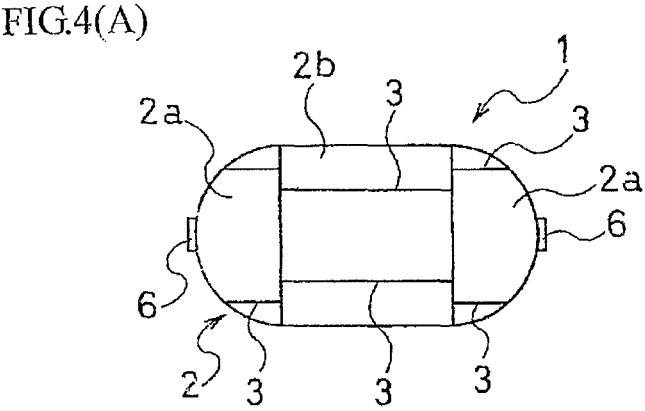
FIG. 4(A) is a front view (the view corresponding to FIG. 1(A)) illustrating an outline of yet another embodiment.
Figure 4B:
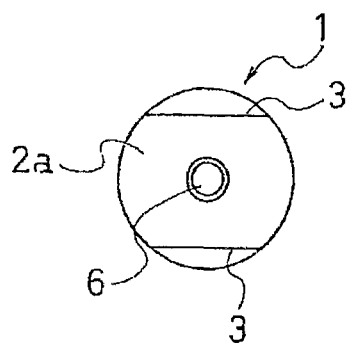
FIG. 4(B) is a side view thereof (the view corresponding to FIG. 1(B))

In another embodiment as illustrated in FIG. 4(A) and FIG. 4(B), at least one (two in the figure) creases 3, 3 extended in the width direction (the lateral direction in the sheet) are formed in the outer surfaces of the mirror body sections 2a, 2a, as illustrated in FIG. 4(B). As such, the creases 3, 3 are formed also in the outer surfaces of the mirror body sections 2a, 2a, so that the operability in the folding of the bag 2 can be further improved.

Figure 5A:
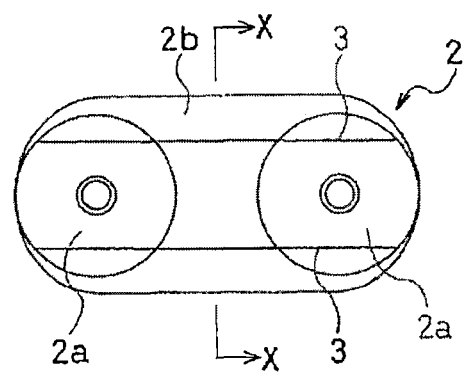
FIG. 5(A) is a plan view illustrating a state where the air is discharged from the pneumatic fender illustrated in FIG. 4(A) and FIG. 4(B) and the bag is collapsed flat.
Figure 6:
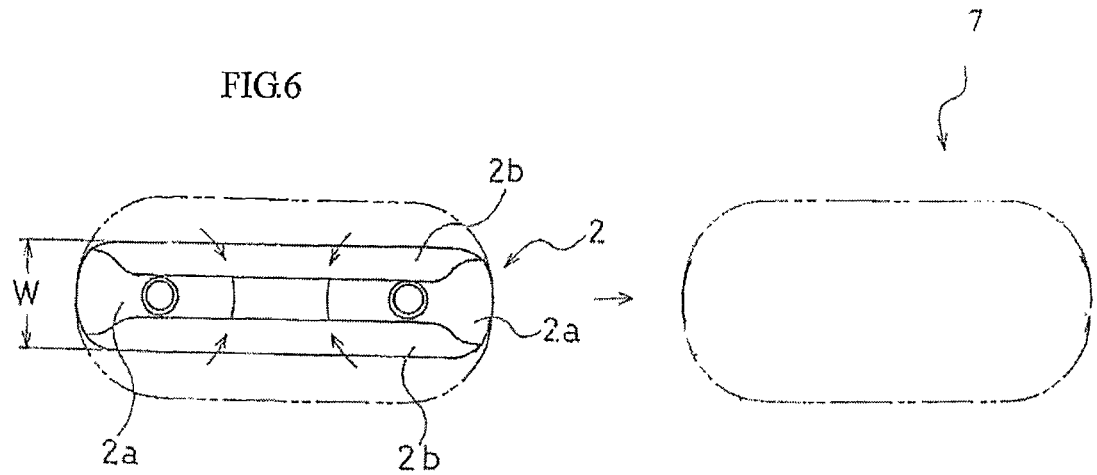
FIG. 6 is a plan view illustrating a state where the bag illustrated in FIG. 5(A) is folded to the arrow direction along the crease.

It is noted that, when the creases 3, 3 are formed in the torso body section 2b and the mirror body sections 2a, 2a, respectively, as described in the above embodiment, respective positions of the creases 3, 3 are adjusted in the torso body section 2b and the mirror body sections 2a, 2a so that respective creases 3, 3 are continuous in the longitudinal direction when the bag 2 has been collapsed flat, as illustrated in FIG. 5(A) described later. Then, after having been collapsed flat, the bag 2 is folded along the creases 3, 3 as the borders, as illustrated in FIG. 6.

In the case described above, the width of the creases 3 formed in the mirror body sections 2a, 2a is preferably wider than the width of the creases 3 formed in the torso body section 2b in order that the creases 3, 3 of the torso body section 2b and the creases 3, 3 of the minor body sections 2a, 2a can be continuous after the bag 2 has been collapsed flat. This allows for a smooth folding operation of the mirror body sections 2a, 2a along the creases 3 formed in the torso body section 2b, so that the operability in the folding can be further improved.

In the present invention, the folding operation of the bag 2 is performed according to the following procedure. It is noted that, in the following description, the procedure will be described for the folding operation in the embodiment of the pneumatic fender 1 illustrated in FIG. 4(A) and FIG. 4(B).

First, after the air is discharged from the bag 2, the bag 2 is collapsed flat with the mirror body sections 2a, 2a facing upward, respectively, as illustrated in FIG. 5(A). For this collapsing operation, it is preferable that both of the mirror body sections 2a, 2a are collapsed so as to be overlapped on the upper surface of the torso body section 2b, respectively.

Then, as illustrated in FIG. 6, the bag 2 is folded along the creases 3, 3 as the borders to the width direction (the vertical direction in the figure) on the upper surface of the bag 2. The folded bag 2 is then loaded to the container 7 and transported. Therefore, the width W of the folded bag 2 is set narrower than the width of the container 7. Therefore, the folded bag 2 is stabilized in its shape by the creases 3, 3 when loaded to the container 7, so that the external damage during the transportation can be reduced and thus the reduction in durability of the bag 2 due to the transportation can be suppressed.

Figure 7A:
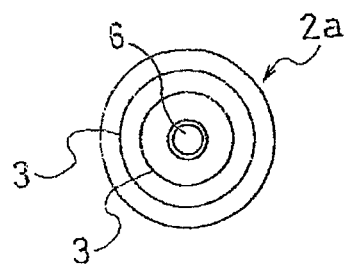
FIG. 7(A) and FIG. 7(B) are side views illustrating a mirror body sections of yet another embodiment, respectively (the views corresponding to FIG. 1(B))
Figure 7B:
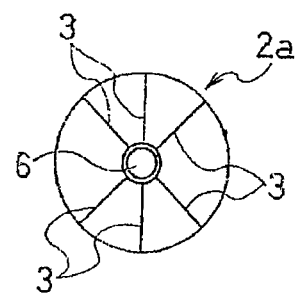

It is noted that, when it has been collapsed flat with the mirror body sections 2a, 2a facing upward as illustrated in FIG. 5(A), the mirror body sections 2a, 2a are kept in the dome shape, respectively. In order to easily collapse flat and fold them, it is preferable that the creases 3 are formed in a concentric manner with respect to the center axis (the base portion 6 in the figure) of the torso body section 2b, as illustrated in FIG. 7(A). Alternatively, as illustrated in FIG. 7(B), it is preferable that the creases 3 are formed in a radial manner with respect to the center axis (the base portion 6 in the figure) of the torso body section 2b, as illustrated in FIG. 7(B). Therefore, it is easier for the mirror body sections 2a, 2a to be bent and deformed on the positions of the creases 3 and be deformed flat, which allows for the smooth folding operation.

It is noted that, although the number of the concentric creases 3 formed in the outer surfaces of the mirror body sections 2a, 2a is two in the embodiment of FIG. 7(A) and the number of the radial creases 3 is six in the embodiment of FIG. 7(B), the number of the creases 3 is not limited to them. The number of the creases 3 may be set in an appropriate manner according to the outer diameter of the torso body section 2b or the shape of the dome of the mirror body sections 2a, 2a.

In the embodiment as described above, in addition to the concentric or radial creases 3, the creases 3 extended in the width direction as illustrated in FIG. 4(B) may be formed in the mirror body sections 2a, 2a. This allows for much smoother folding operation of the bag 2.

Figure 8:
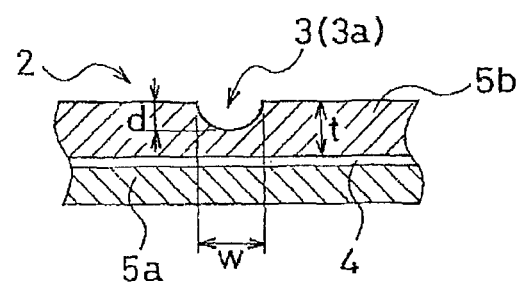
FIG. 8 is a partial cross-sectional view of the bag illustrating the structure of the crease of the present invention.

In the present invention, the creases 3 formed in the outer surfaces of the bag 2 is preferably arranged with the concave groove 3a as illustrated in FIG. 8 in terms of the improvement of the operability in the folding. Thereby, when being folded to the crease 3 side (the upper side in the figure), the bag 2 is bent and deformed so that the opening part of the concave groove 3a is closed, and therefore this bending and deformation allows for the smooth folding operation.

In the present invention, the depth d of the concave groove 3a is preferably set to one-third to two-thirds of the thickness t of the outer layer rubber 5b, preferably, 5 to 25 mm. Further, the opening width w of the concave groove 3a is preferably set to one to ten times the depth d of the concave groove 3a, preferably, 10 to 200 mm. This allows for the improved operability of the folding without degenerating the durability of the bag 2.

Here, if the depth d of the concave groove 3a is less than one-third of the thickness t of the outer layer rubber 5b or less than 5 mm, the operability of the folding will be reduced. If the depth d of the concave groove 3a is greater than two-thirds of the thickness t of the outer layer rubber 5b or greater than 25 mm, the protection effect of the outer layer rubber 5b to the reinforcement layer 4 will be reduced causing the reduction in durability of the bag 2.

Further, if the opening width w of the concave groove 3a is less than the depth d of the concave groove 3a or less than 10 mm, the operability of the folding will be reduced. If the opening width w of the concave groove 3a is greater than ten times the depth d of the concave groove 3a or greater than 200 mm, the protection effect of the outer layer rubber 5b to the reinforcement layer 4 will be reduced causing the reduction in durability of the bag 2.

Figure 9A:
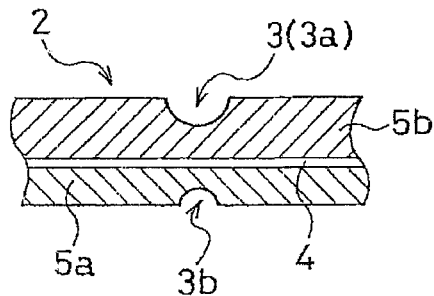
FIG. 9(A) and FIG. 9(B) are partial cross-sectional views of the bag illustrating modified examples of the structure of the crease, respectively.
Figure 9B:
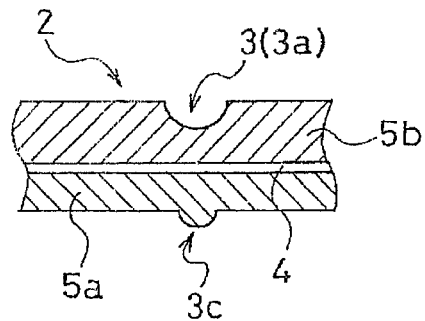

In the present invention, more preferably, the concave line 3b or convex line 3c may be formed inside the bag 2 opposing to the concave groove 3a, as illustrated in FIG. 9(A) and FIG. 9(B). This facilitates the bending and deformation of the bag 2 at the position of the concave groove 3a, which allows for much smoother folding operation of the bag 2.

Figure 10A:
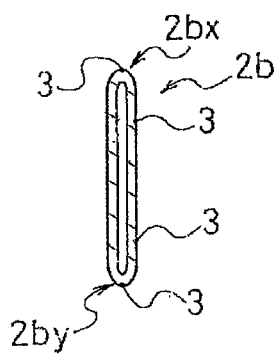
FIG. 10(A) and FIG. 10(B) are cross-sectional views of the bag in yet another embodiment, respectively (the view corresponding to FIG. 5(B)).

Further, in the bag 2 of the present invention, the creases 3 extended in the longitudinal direction may be formed in the opposing positions 2bx, 2by in the torso body section 2b, respectively, as illustrated in FIG. 10(A), in order to make a smooth collapsing operation of the torso body section 2b when the bag 2 is collapsed flat with the mirror body sections 2a, 2a facing upward.

Figure 5B:
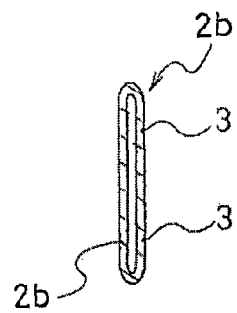
FIG. 5(B) is a cross-sectional view along line X-X of FIG. 5(A)
Figure 10B:
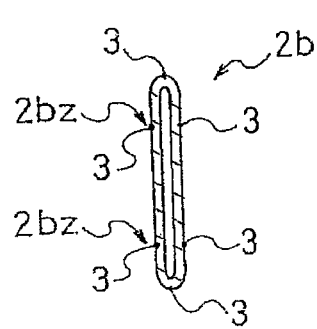

Furthermore, the creases 3 extended in the longitudinal direction may be formed in the fold positions 2bz, 2bz (the positions of the backside corresponding to the creases 3, 3 of FIG. 5(B)) of the under surface (the left side in the figure) of the torso body section 2b, respectively, as illustrated in FIG. 10(B), in order to make a smooth folding operation when the bag 2 is folded along the creases 3, 3 as the borders.

As described above, in the pneumatic fender 1 of the present invention, the width W of the folded bag 2 (see FIG. 6) is required to be slightly narrower than the width of the container 7 in order to prevent the outer surfaces of the bag 2 from contacting to the frame of the container 7 and having external damage. Therefore, the position of the creases 3 formed in the outer surfaces of the bag 2 is required to be set in advance according to the width of the container 7 into which the bag 2 is loaded.

It is noted that the above embodiment has been described on the assumption that at least one crease 3 extended in the longitudinal direction is formed in the outer surface of the torso body section 2b and the bag 2 is folded along the crease 3 as a border and that the width of the folded bag 2 is narrower than the width of the container. However, in the pneumatic fender 1 of the present invention, when the length of the folded bag 2 illustrated in FIG. 6 exceeds the length of the container 7, another crease 3 may be formed in the direction along the circumference of the torso body section 2b and the length of the bag 2 may be adjusted by being folded along the crease 3 as a border.

Further, the above embodiment has been described on the assumption that the creases 3 formed in the longitudinal direction of the torso body section 2b and in the width direction of the minor body sections 2a, 2a are extended in a continuous manner, respectively. In the pneumatic fender 1 of the present invention, however, it is acceptable that these creases 3 are extended in a discontinues manner, respectively, as long as the operability of the folding is not affected. That is, the creases 3 are not limited to the continuous type and may be the discontinuous type. For example, a crease extended in a dotted-line manner may be employed. Further, the concave line 3b and the convex line 3c described above are also not limited to the continuously extended type and may be the discontinuously extended type. For example, a concave line 3b and a convex line 3c extended in a dotted-line manner may be employed.

As described above, in the pneumatic fender 1 of the present invention, at least one crease 3 is formed in the longitudinal direction in the outer surface of the torso body section 2b, which improves the operability in the folding while allowing for the folding into a desired shape. In addition, the reduction in durability of the bag 2 due to the folding and the transportation is suppressed, so that the present invention can be preferably applied to, in particular, the large pneumatic fender 1 that is 2.5 m or more in outer diameter of the torso body section 2b.

EXAMPLES

In order to fabricate a pneumatic fender that is 3.3 m in diameter and 6.5 m in length and load it into a container 7 that is 2.2 m in width and 12 m in length for transportation, fabricated were a conventional pneumatic fender (example of the conventional art) in which no concave groove 3a was formed in the outer surfaces of the torso body section 2b and the mirror body sections 2a, 2a of the pneumatic fender, and pneumatic fenders of the present invention (Examples 1-6) in which the concave grooves 3a were formed in the outer surfaces of the torso body section 2b and the mirror body sections 2a, 2a as indicated in Table 1, respectively.

It is noted that, in Examples 1 and 2, the vertical gap between two concave grooves 3a formed in the torso body section 2b was set to 2 m (likewise in Examples 3-6). In Example 2, the vertical gap between two concave grooves 3a formed in the mirror body section 2a was set to 2.4 m (likewise in Example 4). In Example 5, the gap between two concave grooves 3a formed in the mirror body section 2a was set to 1 m. In Example 6, six concave grooves 3a formed in the mirror body section 2a were arranged in the same pitch in the circumferential direction. Further, in each fender, the thickness of the inner layer rubber 5a was set to 15 mm and the thickness of the outer layer rubber 5b was set to 30 mm.

Each of these seven pneumatic fenders was folded according to the procedure illustrated in FIG. 5(A) and FIG. 6 and loaded into the container 7 in a folded state, and here the time required to load each into the container 7 from the time immediately after the air was discharged was measured. Then, the reduction in the required time was calculated based on the example of the conventional art as the reference, and the results are indicated together in Table 1.

TABLE 1

|  |  | Conventional art | Example 1 | Example 2 | Example 3 | Example 4 | Example 5 | Example 6 |
|---|---|---|---|---|---|---|---|---|
| Depth d of concave groove (mm) | | — | 15 | 15 | 20 | 20 | 20 | 20 |
| Opening width w of concave groove (mm) | | — | 30 | 30 | 50 | 50 | 50 | 50 |
| Torso body section | Position of concave grooves | — | FIG. 5(B) | FIG. 5(B) | FIG. 10(A) | FIG. 10(A) | FIG. 10(A) | FIG. 10(A) |
| | Number of concave grooves | — | Two | Two | Four | Four | Four | Four |
| Mirror body section | Position of concave grooves | — | — | FIG. 4(B) | — | FIG. 4(B) | FIG. 7(A) | FIG. 7(B) |
| | Number of concave grooves | — | None | Two | None | Two | Two | Six |
| Required time | | Reference | 10% reduction | 15% reduction | 15% reduction | 20% reduction | 18% reduction | 18% reduction |

It can be understood from Table 1 that the fender of the present invention allows for a significant improvement in the operability of the folding compared to the fender of the conventional art in which no concave groove 3a is formed.

The invention claimed is:

1. A pneumatic fender having a bag comprising a reinforcement layer interposed between an inner rubber layer and an outer rubber layer, the bag being configured to comprise a cylindrical torso body section and dome-shaped body sections connected to both ends of the torso body section, a plurality of creases are present in an outer surface of the torso body section such that each of the creases extends in a respective longitudinal direction and remains in the outer surface of the torso body section when the cylindrical torso body section is in an uncollapsed condition, each of the creases comprising a respective concave groove configured such that a groove thickness of the cylindrical torso body at each respective concave groove is less than a body thickness of the cylindrical torso body other than at any respective concave groove while the cylindrical torso body section is in the uncollapsed condition and the groove thickness remains less than the body thickness while the cylindrical torso body section is in a collapsed condition, and each respective concave groove provides a respective fold line between respective portions of the cylindrical torso body section to enable the respective portions to fold with respect to each other about the fold line to bring outer surfaces of the respective portions into contact with each other while the cylindrical torso body section is in the collapsed condition.

2. The pneumatic fender according to claim 1, wherein at least one crease extended in a width direction is formed in an outer surface of the dome-shaped body sections at the both ends.

3. The pneumatic fender according to claim 1, wherein at least one crease that is concentric with respect to a center axis of the torso body section is formed in an outer surface of the dome-shaped body sections at the both ends.

4. The pneumatic fender according to claim 1, wherein creases that are radial with respect to a center axis of the torso body section are formed in an outer surface of the dome-shaped body sections at the both ends.

5. The pneumatic fender according to claim 1, wherein, inside the bag, a respective concave line or a respective convex line is formed opposing to each respective concave groove.

6. The pneumatic fender according to claim 1, wherein each respective crease extends in the respective longitudinal direction along an entire length of the outer surface of the torso body section betweeen the both ends of the torso body section.

7. A method for transporting a pneumatic fender, when the pneumatic fender having a bag comprising a reinforcement layer interposed between an inner rubber layer and an outer rubber layer, with the bag being configured to comprise a cylindrical torso body section and dome-shaped body sections connected to both ends of the torso body section, in which a plurality of creases each extended in a respective longitudinal direction remain in an outer surface of the torso body section when the cylindrical torso body section is in an uncollapsed condition, is loaded into a container and transported, the method comprising:

collapsing the bag flat with the dome-shaped body sections facing in a first direction after air is discharged from the bag;

subsequently, folding the bag along the creases, such that each of the creases acts as a respective border between respective portions of the cylindrical torso body and comprises a respective concave groove configured such that a groove thickness of the cylindrical torso body at each respective concave groove is less than a body thickness of the cylindrical torso body other than at any respective concave groove while the cylidrical torso body section is in the uncollapsed condition, to bring outer surfaces of the respective portions facing in the first direction into contact with each other such that the groove thickness remains less than the body thickness while the bag is folded along the crease; and loading the folded bag into a container to transport the folded bag.

8. The method according to claim 7, wherein the folding includes folding the bag along each respective crease which extends in the respective longitudinal direction along an entire length of the outer surface of the torso body section between the both ends of the torso body section.

\* \* \* \* \*